United States Patent [19]
Ziegler

[11] 3,860,332
[45] Jan. 14, 1975

[54] MECHANISM FOR INTERMITTENTLY ADVANCING FILM CINEMATOGRAPHIC APPARATUS OR THE LIKE

[75] Inventor: Karl Ziegler, Nellingen, Germany

[73] Assignee: Robert Bosch Photokino GmbH, Stuttgart, Germany

[22] Filed: June 6, 1974

[21] Appl. No.: 477,083

[30] Foreign Application Priority Data
June 18, 1973 Germany............................ 2330931

[52] U.S. Cl..................... 352/194, 226/70, 352/196
[51] Int. Cl. ............................................ G03b 1/22
[58] Field of Search ........ 352/194, 196; 226/62, 70, 226/71, 72

[56] References Cited
UNITED STATES PATENTS

| | | | |
|---|---|---|---|
| 2,095,744 | 10/1937 | Hanna............................ | 352/196 X |
| 2,569,487 | 10/1951 | Mitchell............................ | 226/72 |
| 2,834,249 | 5/1958 | May............................ | 352/194 X |

Primary Examiner—Monroe H. Hayes
Attorney, Agent, or Firm—Michael S. Striker

[57] ABSTRACT

An intermittent for stepwise transport of film in cinematographic apparatus or printers has a shuttle with a film-engaging claw and a rotary advancing cam with an endless cam face having sections whose configuration satisfies a higher order sine curve and which are tracked by a follower of the shuttle while the claw moves in or counter to the direction of film transport. A first section is tracked by the follower after the claw penetrates into a perforation of the film under the action of an in-out cam and while the claw moves toward engagement with film at the leading end of the perforation. A second section is tracked by the follower while the claw advances the film forwardly; a third section is tracked by the follower while the claw moves rearwardly and away from the film upon completion of a forward stroke but prior to withdrawal of the claw from the perforation by the in-out cam; and a fourth section is tracked by the follower while the claw moves counter to the direction of film transport to move into register with a further perforation.

10 Claims, 4 Drawing Figures

MECHANISM FOR INTERMITTENTLY ADVANCING FILM CINEMATOGRAPHIC APPARATUS OR THE LIKE

BACKGROUND OF THE INVENTION

The present invention relates to cinematographic and like apparatus in general, and more particularly to improvements in mechanisms (known as intermittents or camera movements) for advancing successive frames of photographic film or the like into register with the gate in a motion picture camera, motion picture projector or printer. Such mechanisms employ a pull-down or shuttle having a claw which is caused to enter a perforation of the film, to thereupon advance the film in a desired (first) direction through a predetermined distance, to be subsequently withdrawn from the adjacent perforation, and to move in a second direction (counter to the first direction) so as to be ready to enter a further perforation preparatory to again advancing the film through the predetermined distance. As a rule, the shuttle is pivotable about a fixed axis and receives motion in first and second directions from a first cam (known as main cam or advancing cam) which may but need not cooperate with a spring. The movements of claw into and out of perforations are effected by a second cam (known as in-out cam) which can be designed to flex the shuttle in order to cause the claw to penetrate into the adjacent perforation prior to start of a forward stroke and to leave such perforation upon completion of the forward stroke.

An ideal intermittent would have to operate in such a way that the intervals of time during which the claw performs a forward stroke are extremely short, that the claw invariably advances the film through distances of identical length that the parts of the intermittent produce a minimum of noise, and that the wear upon the film in the region of perforations is negligible. In certain presently known intermittents, the configuration of the advancing cam is such that the acceleration of shuttle during the preliminary forward movement of the claw as well as during the main forward stroke is a cosine function of the angle which the camshaft covers while the claw extends into a perforation and moves forwardly with the film. The preliminary forward movement involves that stage of movement of the shuttle under the action of the advancing cam during which, after having entered a perforation, the claw moves forwardly toward engagement with the film surface at the leading end of the perforation. As a rule, the movement of claw toward such surface is slow and takes place at a constant speed. The claw is thereupon accelerated to advance the film forwardly. Shortly before the claw completes the transport of film by the length of a frame, it undergoes an abrupt deceleration to zero speed preparatory to withdrawal from the engaged perforation.

It has been found that such abrupt and practically instantaneous deceleration of the shuttle to zero speed produces several undesirable results. Thus, the inertia of shuttle causes the claw to move forwardly so that the film is advanced through a distance which exceeds an optimum distance. The elasticity of the shuttle suffices to allow the claw to move forwardly beyond an optimum position for withdrawal from the engaged perforation whereby the claw prevents the film frames from being in exact register with the gate during picture taking or during the projection of images of exposed and developed film frames. In order to prevent the inertia of abruptly decelerated shuttle from causing its claw to move the film through a distance exceeding the desirable maximum distance, many cinematographic apparatus employ pressure plates which bear against the film with a considerable force, at least in the immediate vicinity of the gate, so that the claw must overcome a substantial resistance during the initial stage of forward movement with the engaged perforation of the film. Also, such mode of controlling the forward transport of film frames into register with the gate causes considerable wear on the film, especially in the regions around the perforations.

It was further proposed to employ intermittents wherein the forward speed of the claw at the time it contacts the film surface at the front end of an engaged perforation is zero (i.e., wherein the claw begins to move forwardly subsequent to penetration into a fresh perforation and subsequent to contact with film at the leading end of such perforation) and wherein the forward speed of the claw upon completion of a forward stroke is also reduced to zero before the claw is withdrawn so that it can start a return stroke. Such intermittents failed to gain acceptance in the art of cinematographic apparatus (especially in the art of motion picture projectors wherein the angle through which the shuttle moves during a forward stroke of its claw is very small) because the shuttle must be accelerated at a higher rate and must reach a much higher speed than in the aforedescribed conventional intermittents. It has been found that an extremely fast acceleration and/or deceleration can result in disengagement of the follower on the shuttle from the advancing cam; this creates excessive noise due to repeated striking of the follower against the cam face.

SUMMARY OF THE INVENTION

An object of the invention is to provide a novel and improved intermittent for use in cinematographic and like apparatus to advance motion picture film in stepwise fashion through distances of identical length, with a minimum of noise, and without appreciable wear on the film.

Another object of the invention is to provide a novel advancing cam for use in the improved intermittent.

A further object of the invention is to provide an intermittent which is capable of placing successive film frames into exact register with the gate or with a copying aperture even if the film is not biased by strong pressure plates or held by registration pins or analogous auxiliary parts.

An additional object of the invention is to provide an intermittent wherein the acceleration of film from zero speed during the initial stage of a forward stroke of the shuttle is selected with a view to avoid undue stressing of film in the region of perforations and wherein the force which is required to move the shuttle is smaller than in heretofore known intermittents.

The invention is embodied in an intermittent which is used in a cinematographic or like apparatus wherein a film having a row of perforations is advanced stepwise in a predetermined direction and along a predetermined film path. The intermittent comprises a shuttle having a claw movable in and counter to the predetermined direction to thereby move from register with a preceding into register with a following perforation and thereupon into the following perforation in order to advance the film in the predetermined direction. The intermittent further comprises means for moving the shuttle to thereby move the claw in and counter to the predetermined direction, and such means includes a rotary advancing cam provided with a cam face which includes a plurality (preferably at least three) of sections each of which is configured to satisfy the equation $$S = (S_E-S_A/\alpha_E-\alpha_A)(\alpha-\alpha_A) - (S_E-S_A/2\pi)\sin(360/\alpha_E-\alpha_A)(\alpha-\alpha_A) + S_A,$$

wherein $S$ is a section, $S_A$ is the starting point of such section, $S_E$ is the terminal point of such section, $\alpha_A$ is the angle at the starting point and $\alpha_E$ is the angle at the terminal point of the respective section. The means for moving the claw further comprises follower means which engages the cam face and tracks one of the aforementioned plurality of sections while the claw moves in or counter to the predetermined direction.

The advancing cam can be such that the configuration of the entire cam face satisfies the aforementioned equation, i.e., that the sections of the aforementioned plurality constitute the entire cam face.

The sections of the aforementioned plurality include at least two sections which are tracked by the follower means while the claw moves in the predetermined direction and at least one section which is tracked by the follower means while the claw moves counter to the predetermined direction.

A first section of the aforementioned plurality of sections can be tracked by the follower means after the claw penetrates into a perforation whereby the cam causes the claw to move in the predetermined direction toward engagement with the film at the leading end of such perforation. This first section is preferably immediately followed by a second section which is tracked by the follower means while the cam causes the claw to advance the film in the predetermined direction. The end of the first section preferably merges into the second section in such a way that the transition from movement of the claw toward engagement with the film into movement with the film takes place gradually, i.e., without abrupt changes in distance and velocity per unit of time.

The length of that portion of the first section, as considered in the circumferential direction of the advancing cam, which is tracked by the follower means while the claw moves toward engagement with the film subsequent to penetration into a perforation is preferably less than or at most equals one-fourth of the total length of the first section.

The novel features which are considered as characteristic of the invention are set forth in particular in the appended claims. The improved intermittent itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1A:
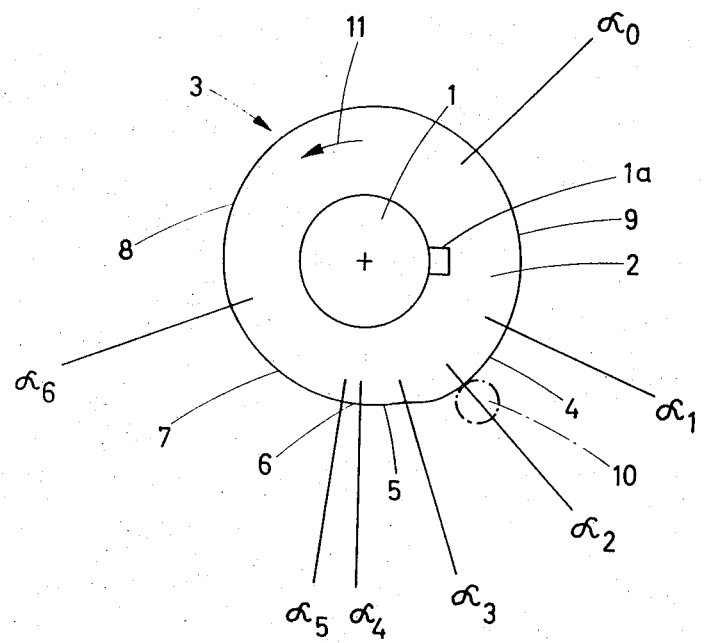
FIG. 1a is an enlarged elevational view of the advancing cam.
Figure 1:
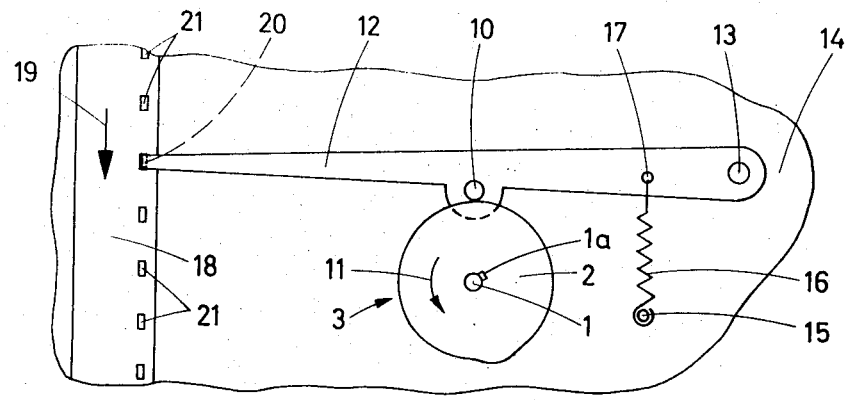
FIG. 1 is a schematic elevational view of a portion of an intermittent including a rotary advancing cam which embodies the invention.

FIG. 1 shows a portion of a cinematographic apparatus having a housing 14 supporting a fixed pivot member 13 for a shuttle or pull-down 12. An intermediate portion of the shuttle 12 carries a roller follower or a pin-shaped follower 10 which is biased against the endless peripheral surface or cam face 3 of a rotary disk-shaped advancing cam 2 by a helical spring 16. One end portion of the spring 16 is attached to a post 15 which is fixedly secured to the housing 14, and the other end portion of the spring 16 extends into a small hole 17 of the shuttle 12. The advancing cam 2 is fixed to and is rotated by a camshaft 1 which is journalled in the housing 14. That end portion of the shuttle 12 which is remote from the pivot member 13 carries a claw or tooth 20 which can enter successive or selected perforations 21 of a motion picture film 18. The direction in which the claw 20 advances the film 18 stepwise so as to place successive film frames into register with a gate or copying aperture, not shown, is indicated by an arrow 19. The film 18 is threaded through the cinematographic apparatus in a conventional manner not forming part of the invention. The cinematographic apparatus further comprises a customary in-out cam (not shown) which causes the claw 20 to leave the adjacent perforation 21 upon completion of a forward stroke (arrow 19) and causes or allows the claw 20 to enter a further perforation 21 after the shuttle 12 completes a clockwise pivotal movement (as viewed in FIG. 1) under the action of the advancing cam 2. The direction in which the cam 2 is driven by the camshaft 1 is indicated by an arrow 11, and the reference character 1a denotes a key or an analogous coupling element which compels the cam 2 to share all angular movements of the camshaft. It will be noted that the claw 20 moves forwardly under the action of the spring 16 which latter maintains the follower 10 of the shuttle 12 in permanent engagement with the cam face 3, and that the claw 20 moves rearwardly (counter to the direction indicated by the arrow 19) under the action of the advancing cam 2. It is clear that the functions of the cam 2 and spring 16 can be reversed, or that the spring 16 can be omitted if the follower 10 tracks a cam face which is provided in an endless groove of the advancing cam.

The configuration of the face 3 on the cam 2 is shown in FIG. 1a. At least certain sections S of this cam face are shaped in such a way that their configuration satisfies the higher order sine, curve equation $$S = (S_E-S_A/\alpha_E-\alpha_A)(\alpha-\alpha_A) - (S_E-S_A/2\pi)\sin(360/\alpha_E-\alpha_A)(\alpha-\alpha_A) + S_A,$$

wherein $S_A$ indicates the starting point of the corresponding section of the cam face 3, $S_E$ indicates the terminal point of the corresponding section, $\alpha_A$ indicates the angle at the starting point and $\alpha_E$ indicates the angle at the terminal point.

Successive sections of the cam face 3 are indicated at 4, 5, 6, 7, 8 and 9. The section 4 is that section of the cam face 3 which causes the claw 20 (after the claw has penetrated with some clearance into the adjacent perforation 21) to move forwardly toward engagement with the film surface at the leading end of such perforation. This section begins at $\alpha_1$ (corresponding to the angle $\alpha_A$ in the preceding equation and ends at $\alpha_2$ (corresponding to the angle $\alpha_E$). While the follower 10 tracks the section 4 of the cam face 3, the claw 20 advances forwardly (arrow 19) through a distance corresponding to that between $s_1$ and $s_2$ in the diagram of FIG. 2. The acceleration of claw 20 during tracking of the cam face section 4 by the follower 10 is indicated in FIG. 3 by that portion of the velocity curve which extends between $\alpha_1$ and $\alpha_2$, i.e., the claw 20 is accelerated from zero speed to a speed $v_2$.

The section 4 is immediately followed by the section 5 of the cam face 3. The section 5 starts at the angle $\alpha_2$ and ends at the angle $\alpha_4$, i.e., it extends through an intermediate angle $\alpha_3$. During tracking of the section 5 by the follower 10, the claw 20 covers the distance from $s_2$ to $s_4$ (see FIG. 2) and is first accelerated (between $\alpha_2$ and $\alpha_3$) and thereupon decelerated to zero speed (between $\alpha_3$ and $\alpha_4$) in a manner as indicated by the velocity curve of FIG. 3. Thus, the claw 20 performs a complete working stroke while the follower 10 of the shuttle 13 tracks the cam face section 5.

The section 5 is immediately followed by a third section 6 which is tracked by the follower 10 between the angles $\alpha_4$ and $\alpha_5$. The section 6 causes the claw 20 to move slightly away from the surface at the front end of the engaged perforation 21 (i.e., rearwardly) so that the claw can be readily withdrawn from such perforation (by the in-out cam) while the follower 10 tracks the next section 7 of the cam face 3. The section 7 constitutes a portion of a circular cylindrical surface so that the claw 20 does not move in or counter to the direction indicated by arrow 19 while the follower 10 tracks the cam face 3 between the angles $\alpha_5$ and $\alpha_6$.

When the follower 10 reaches the next section 8 of the cam face 3 (i.e., while it moves from $\alpha_6$ to $\alpha_0$), the claw 20 moves rearwardly toward register with a fresh perforation 21. The section 8 is followed by a section 9 whose configuration is identical with that of the section 7 (i.e., the section 9 also forms part of a circular cylindrical surface whose axis coincides with that of the camshaft 1) so that, while moving from $\alpha_0$ to $\alpha_1$, the follower 10 allows the claw 20 to remain at a standstill insofar as its movement in or counter to the direction of arrow 19 is concerned. However, the aforementioned in-out cam then causes the claw 20 to penetrate into the adjacent perforation 21 so that the claw can begin to move forwardly toward engagement with the surface at the leading end of such perforation as soon as the follower 10 begins to track the section 4. It will be noted that the sections 4–9 together constitute a circumferentially complete endless cam face wherein the configuration of a plurality of sections (4, 5, 6 and 8) satisfies the aforementioned equation. The movements of claw 20 under the action of the in-out cam take place substantially at right angles to the plane of FIG. 1 or 1a. As mentioned before, the in-out cam can flex the shuttle 12 between the follower 10 and claw 20.

Figure 2:
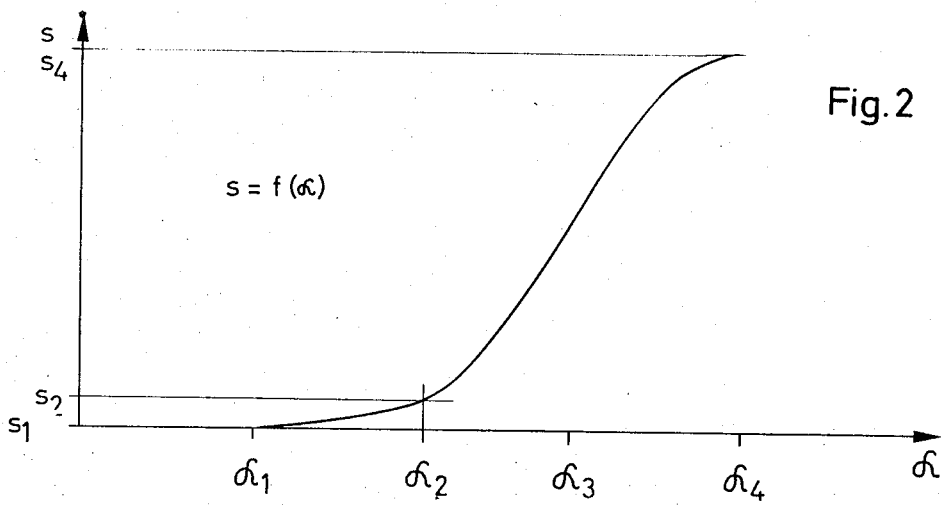
FIG. 2 is a diagram showing the distance which the claw of the shuttle covers in the forward direction during rotation of the advancing cam through certain angles.
Figure 3:
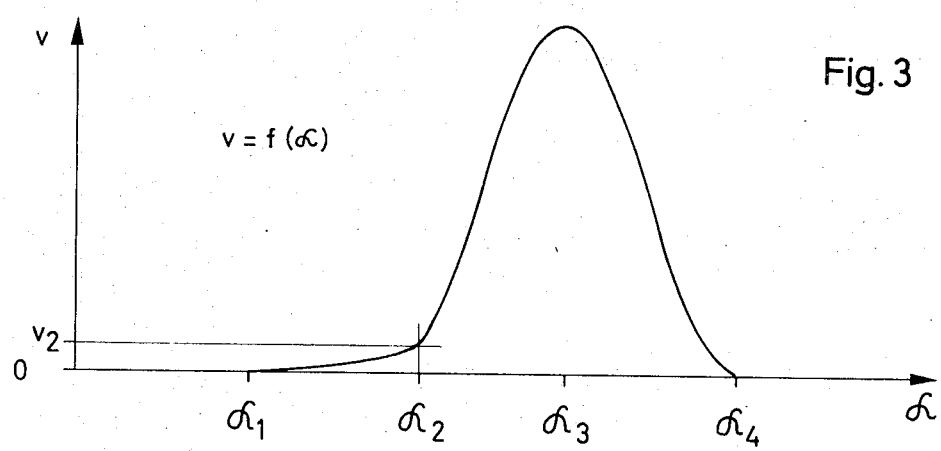
FIG. 3 is a corresponding velocity diagram.

FIG. 2 shows that the transition from movement of the claw 20 into engagement with a film surface in the entered perforation 21 toward movement which is necessary to advance the film 18 by the length of a frame (at $\alpha_2$) is gradual. FIG. 3 shows that the velocity curve does not exhibit any sharp angles, i.e., that the transition from speed between the angles $\alpha_1$ and $\alpha_2$ to speed between the angles $\alpha_2$ and $\alpha_3$ as well as between the angles $\alpha_3$ and $\alpha_4$ is gradual.

Figure 4:
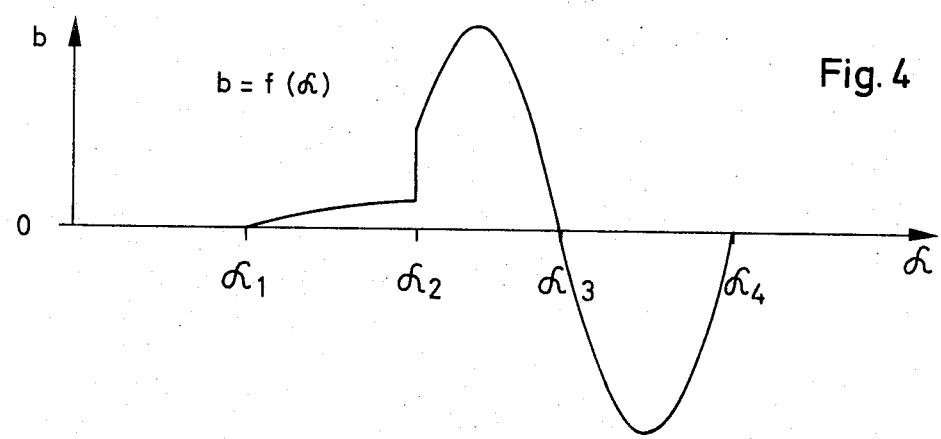
FIG. 4 is a corresponding acceleration diagram.

It is also within the scope of the invention to configurate the face of the advancing cam in such a way that the acceleration curve exhibits a sharp transition at the angle $\alpha_2$ (see FIG. 4). The stressing of film due to such configuration of the cam face is rather small because the acceleration at $\alpha_2$ is less than in heretofore known intermittents. It has been found that, if the cam face is configurated to accelerate the claw in a manner as shown in FIG. 4, the claw is not likely to unduly stress the film at the time it moves into engagement with the surface at the leading end of a perforation. FIG. 4 further shows the manner in which the acceleration of the claw 20 varies during movement in the direction indicated by arrow 19 in FIG. 1 (i.e., between $\alpha_2$ and $\alpha_4$). Thus, the claw 20 is accelerated between $\alpha_1$ and $\alpha_3$, and is decelerated from $\alpha_3$ to $\alpha_4$.

It is further possible to design the cam 2 in such a way that each and every section of its cam face satisfies the aforementioned equation.

The length of that portion of the first section 4 which is actually utilized for moving the claw 20 (after the claw has entered a perforation) toward the surface at the leading end of the entered perforation may be less than or need not exceed one-fourth of the overall length of the first section, as considered in the circumferential direction of the advancing cam 2. In such instances, the major part (about three-fourths) of the first section 4 and the first or foremost portion of the second section 5 are practically ineffective for forward movement of the claw and are of significance only insofar as the calculation of configuration of the cam face 3 is concerned. In other words, the major part (about three-fourths) of the first part of the section 4 preceding the angle $\alpha_2$ shown in FIG. 1a and the first part of the section 5 immediately following the angle $\alpha_2$ in FIG. 2 may be of identical configuration.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a cinematographic or like apparatus wherein a film having a row of perforations is advanced stepwise in a predetermined direction and along a predetermined path, an intermittent comprising a shuttle having a claw movable in and counter to said direction to thereby move from register with a preceding into register with a following perforation and thereupon into the following perforation to advance the film in said direction; and means for moving said shuttle to thereby move said claw in and counter to said direction, comprising a rotary advancing cam including a cam face having a plurality of sections each configurated to satisfy the equation $$S = (S_E - S_A/\alpha_E - \alpha_A)(\alpha - \alpha_A) - (S_E - S_A/2\pi) \sin(360/\alpha_E - \alpha_A)(\alpha - \alpha_A) + S_A,$$

wherein $S$ is a section of said cam face, $S_A$ is the starting point of the section, $S_E$ is the terminal point of the section, $\alpha_A$ is the angle at the starting point and $\alpha_E$ is the angle at the terminal point, and follower means provided on said shuttle and engaging said cam face, said follower means tracking one of said plurality of sections while said claw moves in or counter to said direction.

2. An intermittent as defined in claim 1, wherein the configuration of the entire face of said cam satisfies said equation.

3. An intermittent as defined in claim 1, wherein said plurality of sections include at least two sections which are tracked by said follower means while said claw moves in said direction.

4. An intermittent as defined in claim 1, wherein said plurality of sections include a first section which is tracked by said follower means subsequent to penetration of said claw into a perforation and while said claw moves in said direction to engage the film at the leading end of the respective perforation.

5. An intermittent as defined in claim 4, wherein said plurality of sections include a second section immediately following said first section and being tracked by said follower means while said claw advances the film in said direction, said first section merging into said second section so that the transition from movement of said claw toward engagement with the film into movement with the film takes place gradually without abrupt changes in distance and velocity per unit of time.

6. An intermittent as defined in claim 4, wherein said claw moves in said direction while said follower means tracks a portion of said first section whose length is less than or at most equals one-fourth of the total length of said first section.

7. An intermittent as defined in claim 1, further comprising means for biasing said follower means against said cam face.

8. An intermittent as defined in claim 1, wherein said cam face comprises at least one additional section which is part of a circular cylindrical surface so that the position of said claw, as considered in said direction, remains unchanged while said follower means tracks said additional section.

9. An intermittent as defined in claim 1, wherein said plurality of sections include at least three sections.

10. An intermittent as defined in claim 1, wherein said plurality of sections include a first section which is tracked by said follower means subsequent to entry of said claw into a perforation and while the claw moves in said direction toward engagement with the film at the leading end of such perforation, a second section which is tracked by said follower means while said claw advances the film in said direction, a third section which is tracked by said follower means while said claw moves in a perforation counter to said direction upon completion of forward transport of the film, and a fourth section which is tracked by said follower means while said claw moves counter to said direction and does not extend into a perforation.

* * * * *